US011061833B2

(12) United States Patent
Murray et al.

(10) Patent No.: US 11,061,833 B2
(45) Date of Patent: Jul. 13, 2021

(54) APPARATUS AND METHOD FOR HANDLING PAGE PROTECTION FAULTS IN A COMPUTING SYSTEM

(71) Applicant: International Business Machines Corporation, Armonk, NY (US)

(72) Inventors: Simon Murray, Manchester (GB); Geraint M. North, Manchester (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/715,902

(22) Filed: Dec. 16, 2019

(65) Prior Publication Data

US 2020/0133889 A1 Apr. 30, 2020

Related U.S. Application Data

(63) Continuation of application No. 15/290,696, filed on Oct. 11, 2016, now Pat. No. 10,534,727, which is a continuation of application No. 14/262,258, filed on Apr. 25, 2014, now Pat. No. 9,483,419, which is a continuation of application No. 12/268,881, filed on Nov. 11, 2008, now Pat. No. 8,719,541.

(30) Foreign Application Priority Data

Jul. 29, 2008 (GB) ..................................... 0813833

(51) Int. Cl.
*G06F 12/14* (2006.01)
*G06F 8/52* (2018.01)
(Continued)

(52) U.S. Cl.
CPC ............ *G06F 12/1483* (2013.01); *G06F 8/52* (2013.01); *G06F 9/4552* (2013.01);
(Continued)

(58) Field of Classification Search
None
See application file for complete search history.

(56) References Cited

U.S. PATENT DOCUMENTS 5,440,710 A 8/1995 Richter et al.
5,765,206 A 6/1998 Hohensee et al.
(Continued)

FOREIGN PATENT DOCUMENTS

WO 2000022521 4/2000
WO 2004095264 11/2004
(Continued)

OTHER PUBLICATIONS

Examination Report; European Application No. 09 781 038.6; dated Oct. 30, 2015.

*Primary Examiner* — Gary W. Cygiel
(74) *Attorney, Agent, or Firm* — Grant M. McNeilly

(57) ABSTRACT

Method and apparatus for handling page protection faults in combination particularly with the dynamic conversion of binary code executable by a one computing platform into binary code executed instead by another computing platform. In one exemplary aspect, a page protection fault handling unit is used to detect memory accesses, to check page protection information relevant to the detected access by examining the contents of a page descriptor store, and to selectively allow the access or pass on page protection fault information in accordance with the page protection information.

20 Claims, 15 Drawing Sheets

(51) Int. Cl.
  *G06F 9/455* (2018.01)
  *G06F 12/10* (2016.01)
  *G06F 12/12* (2016.01)
  *G06F 12/1009* (2016.01)

(52) U.S. Cl.
  CPC .......... *G06F 9/45537* (2013.01); *G06F 12/10* (2013.01); *G06F 12/1009* (2013.01); *G06F 12/12* (2013.01); *G06F 12/145* (2013.01); *G06F 2212/1052* (2013.01)

(56) References Cited

U.S. PATENT DOCUMENTS

| | | |
|---|---|---|
| 6,199,152 B1 | 3/2001 | Kelly et al. |
| 7,277,998 B1 | 10/2007 | Agesen et al. |
| 2004/0064668 A1 | 4/2004 | Kjos et al. |
| 2008/0140971 A1* | 6/2008 | Dankel ............... G06F 12/1036 711/163 |

FOREIGN PATENT DOCUMENTS

| | | |
|---|---|---|
| WO | 2004097631 | 11/2004 |
| WO | 2005006106 | 1/2005 |
| WO | 2005008478 | 1/2005 |
| WO | 2006103395 | 10/2006 |

\* cited by examiner

| 611 | 612 | 613 |
|---|---|---|
| WRITE INHIBIT | WRITE INHIBIT | EXECUTE INHIBIT |

| 611 | 612 | 613 |
|---|---|---|
| 0 | 0 | 1 |

| 611 | 612 | 613 |
|---|---|---|
| 0 | 1 | 1 |

| 0 | 0 | 0 | | 0x8048000 |
|---|---|---|---|---|

FIG. 6d

| 0 | 1 | 0 | | 0x8048000 |
|---|---|---|---|---|

FIG. 6e

APPARATUS AND METHOD FOR HANDLING PAGE PROTECTION FAULTS IN A COMPUTING SYSTEM

FIELD OF THE INVENTION

The present invention relates generally to the field of computers and computer systems and, more particularly, to the handling page protection faults in the context of program code conversion methods and apparatus useful, for example, in code translators, emulators and accelerators. More particularly, the exemplary embodiments of the present invention relate to a method and apparatus for handling page protection faults in combination with the dynamic conversion of binary code executable by a one computing platform into binary code executable instead by another computing platform.

BACKGROUND OF THE INVENTION

The central processing unit (CPU) or processor lies at the heart of all modern computing systems. The processor executes instructions of a computer program and thus enables the computer perform useful work. CPUs are prevalent in all forms of digital devices in modern life and not just dedicated computing machines such as personal computers, laptops and PDAs. Modern microprocessors appear in everything from automobiles to cellular telephones to children's toys.

A problem arises in that program code which is executable by one type of processor often cannot be executed in any other type of processor, because each type of processor has its own unique Instruction Set Architecture (ISA). Hence, program code conversion has evolved to automatically convert program code written for one type of processor into code which is executable by another type of processor, or to optimise an old, inefficient piece of code into a newer, faster version for the same type of processor. That is, in both embedded and non-embedded CPUs, there are predominant ISAs for which large bodies of software already exist that could be "accelerated" for performance or "translated" to other processors that present better cost/performance benefits. One also finds dominant CPU architectures that are locked in time to their ISA and cannot evolve in performance or market reach. This problem applies at all levels of the computing industry, from stand-alone pocket-sized computing devices right through to massive networks having tens or hundreds of powerful servers.

As background information in this field of program code conversion, PCT publication WO2000/22521 entitled "Program Code Conversion", WO2004/095264 entitled "Method and Apparatus for Performing Interpreter Optimizations during Program Code Conversion", WO2004/097631 entitled "Improved Architecture for Generating Intermediate Representations for Program Code Conversion", WO2005/006106 entitled "Method and Apparatus for Performing Adjustable Precision Exception Handling", and WO2006/103395 entitled "Method and Apparatus for Precise Handling of Exceptions During Program Code Conversion", which are all incorporated herein by reference, disclose methods and apparatus to facilitate program code conversion capabilities as may be employed in the example embodiments discussed herein.

One particular problem area concerns the handling of page protection faults. A page protection fault is a type of exception that is raised when a program tries to manipulate a memory location in a way that violates set permissions governing the types of manipulation allowed for that memory location. Typically permissions protecting memory locations are set per page of memory and hence faults generated in this way are referred to as page protection faults.

Where the original program code (here called "subject code") has been written according to a particular type of processor, then that subject code requires a particular type of execution environment and expects an appropriate mechanism for the handling of page protection faults. However, under program code conversion, the subject code is instead converted into target code and is executed on a target computing system. There is now a difficulty in providing an appropriate mechanism to correctly handle the page protection fault behaviour of the subject code.

A further problem arises in that the subject code may have been written to make extensive use of a finer granularity of page protection than is supported by the native hardware are available on the target computing platform. For example, processors of the Intel™ x86 family support page protection for pages of sizes as small as 4096 bytes (4 kB). However, IBM™ PowerPC processors are often configured by the operating system to offer page protection for pages only as small as 64 kB.

These and other problems of the prior art are addressed by the exemplary embodiments of the present invention as will be discussed in more detail below.

SUMMARY OF THE INVENTION

According to the present invention there is provided a computer system, a computer-readable storage medium and a method as set forth in the appended claims. Other features of the invention will be apparent from the dependent claims, and the description which follows.

The following is a summary of various aspects and advantages realizable according to embodiments of the invention. It is provided as an introduction to assist those skilled in the art to more rapidly assimilate the detailed discussion that follows and does not and is not intended in any way to limit the scope of the claims that are appended hereto.

In particular, the inventors have developed methods directed at program code conversion. These methods are especially useful in connection with a run-time translator that provides dynamic run-time translation or acceleration of binary program code.

In one exemplary aspect of the present invention there is provided a computing system, comprising: a translator unit arranged to convert a subject code into a target code, the subject code comprising a reference to at least one subject memory page having associated subject page access attributes;

a target processor unit arranged to execute the target code;

a target memory associated with the target processor unit and including a page descriptor store and plurality of memory locations related to the subject memory pages, wherein the plurality of memory locations are each associated with information in the page descriptor store according to the subject page access attributes;

wherein the translator unit is arranged to allow an attempt to access a target memory location within the plurality of memory locations to proceed without an interruption in control flow, if the attempted access is within the scope of the subject page access attributes for the associated subject memory page.

In one embodiment, the subject code is binary program code which is directly executable by a processor of a subject type.

In one embodiment, the target code is binary program code which is directly executable by the processor unit.

In one embodiment, translator unit is arranged to convert the subject code being binary program code which is directly executable by a processor of a first type into the target code being binary program code which is directly executable by the processor unit.

In one embodiment, the translator unit is arranged to translate the subject code written for execution by a processor of a first type into the target code executed by the processor unit of a different, non-compatible second type.

In one embodiment, the translator unit is arranged to optimise the subject code written for execution by a processor of a first type into the target code that is executed more efficiently by the processor unit of the same first type.

In another aspect of the present invention there is provided a method of handling page protection faults comprising the steps of: converting a subject code executable that comprises a reference to at least one subject memory page having associated subject page access permissions into a target code executable by the at least one target processor and including references to a target memory, the conversion including establishing a page descriptor store according to the reference to the subject memory page and the associated subject page permissions; and allowing an attempt to access a target memory location within the plurality of memory locations to proceed without an interruption in control flow, if the attempted access is within the scope of the subject page access attributes for the associated subject memory page.

In a still further aspect of the present invention there is provided a computer readable recording medium having instructions recorded thereon which when executed by a computing system having at least one target processor cause the computing system to perform at least the steps of: converting a subject code executable that comprises a reference to at least one subject memory page having associated subject page access permissions into a target code executable by the at least one target processor and including references to a target memory, the conversion including establishing a page descriptor store according to the references to the subject memory pages and the associated subject page permissions; and allowing an attempt to access a target memory location within the plurality of memory locations to proceed without an interruption in control flow, if the attempted access is within the scope of the subject page access attributes for the associated subject memory page.

The exemplary embodiments enable detection and correct handling of page protection fault behaviour of the subject code. As a result, the computing system is now able to accurately and reliably provide subject code page protection functionality on the processor.

Further, the exemplary embodiments discussed herein are arranged to facilitate efficient checking of subject page permissions allowing fast and efficient emulation of subject page protection behaviour. In the exemplary embodiments discussed herein, subject code which expects fine page size granularity is readily supported when converted to target code and executed on the target computing platform that supports only coarser granularity.

The present invention also extends to a computer-readable storage medium having instructions recorded thereon which when implemented by a computer system perform any of the methods defined herein.

At least some embodiments of the invention may be constructed, partially or wholly, using dedicated special-purpose hardware. Terms such as 'component', 'module' or 'unit' used herein may include, but are not limited to, a hardware device, such as a Field Programmable Gate Array (FPGA) or Application Specific Integrated Circuit (ASIC), which performs certain tasks. Alternatively, elements of the invention may be configured to reside on an addressable storage medium and be configured to execute on one or more processors. Thus, functional elements of the invention may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Further, although the preferred embodiments have been described with reference to the components, modules and units discussed below, such functional elements may be combined into fewer elements or separated into additional elements.

BRIEF DESCRIPTION OF THE DRAWINGS

The accompanying drawings, which are incorporated in and constitute a part of the specification, illustrate presently preferred implementations and are described as follows:

FIGS. 6a-6e are further schematic diagrams illustrating parts of an exemplary computing system relating to page protection fault handling;

DETAILED DESCRIPTION

The following description is provided to enable a person skilled in the art to make and use the invention and sets forth the best modes contemplated by the inventors of carrying out their invention. Various modifications and equivalents, however, will be readily apparent to those skilled in the art, based on the general principles of the present invention as explained herein.

Figure 1:
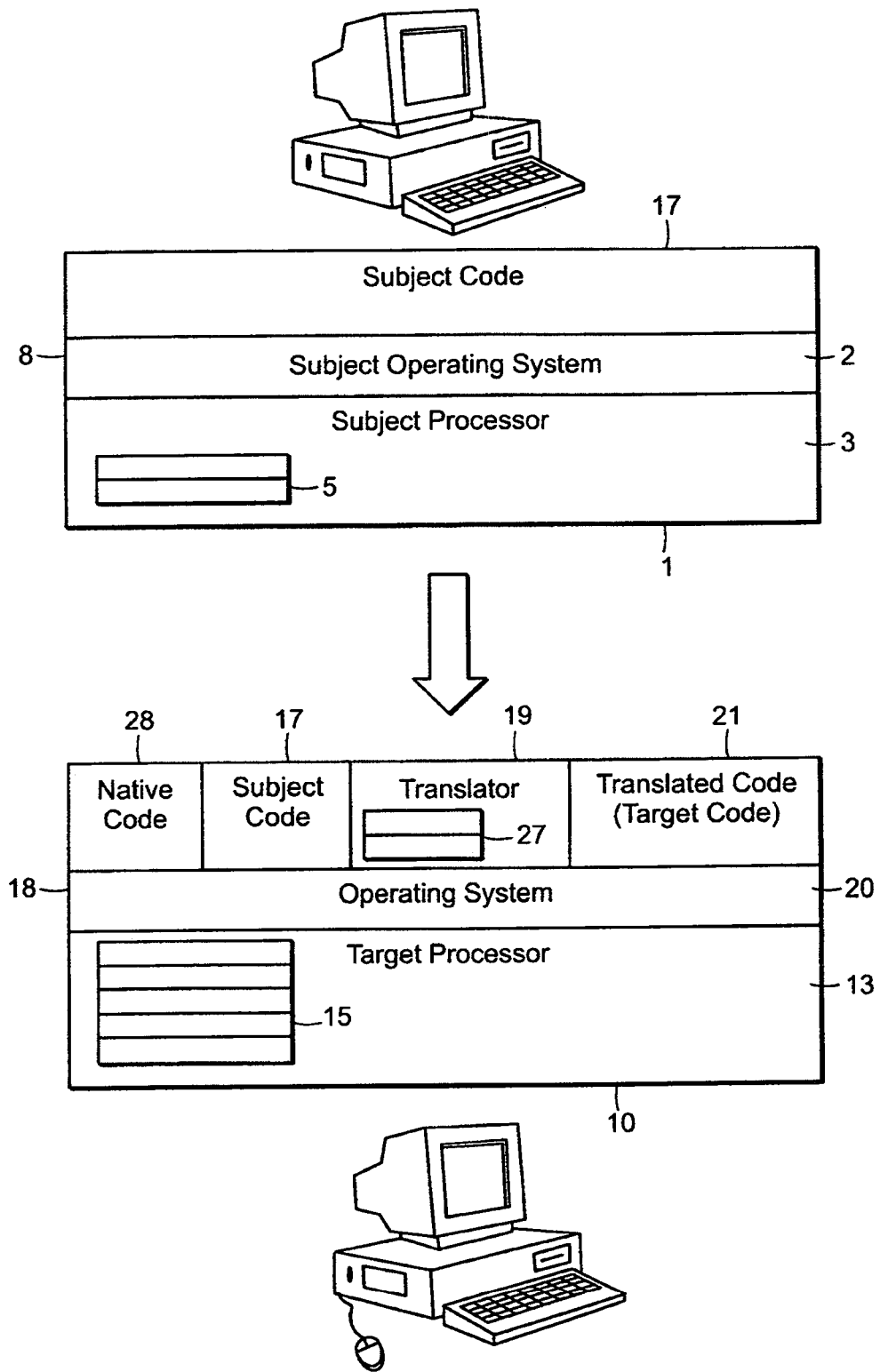
FIG. 1 is a block diagram illustrative of apparatus wherein embodiments of the invention are applied.

FIG. 1 gives an overview of a system and environment where the example embodiments of the present invention are applied, in order to introduce the components, modules and units that will be discussed in more detail below. Referring to FIG. 1, a subject program 17 is intended to execute on a subject computing platform 1 having at least one subject processor 3. However, a target computing platform 10 is instead used to execute the subject program 17, through a translator unit 19 which performs program code conversion. The translator unit 19 performs code conversion from the subject code 17 to target code 21, such that the target code 21 is executable on the target computing platform 10.

As will be familiar to those skilled in the art, the subject processor 3 has a set of subject registers 5. A subject memory 8 holds, inter alia, the subject code 17 and a subject operating system 2. Similarly, the example target computing platform 10 in FIG. 1 comprises at least one target processor 13 having a plurality of target registers 15, and a memory 18 to store a plurality of operational components including a target operating system 20, the subject code 17, the translator code 19, and the translated target code 21. The target computing platform 10 is typically a microprocessor-based computer or other suitable computer.

In one embodiment, the translator code 19 is an emulator to translate subject code of a subject instruction set architecture (ISA) into translated target code of another ISA, with or without optimisations. In another embodiment, the translator 19 functions as an accelerator for converting the subject code into the target code, each of the same ISA, whilst performing various optimisations that improve performance of the target computing platform.

The translator code 19 is suitably a compiled version of source code implementing the translator, and runs in conjunction with the operating system 20 on the target processor 13. It will be appreciated that the structure illustrated in FIG. 1 is exemplary only and that, for example, software, methods and processes according to embodiments of the invention may be implemented in code residing within or beneath an operating system 20. The subject code 17, translator code 19, operating system 20, and storage mechanisms of the memory 18 may be any of a wide variety of types, as known to those skilled in the art.

In the apparatus according to FIG. 1, program code conversion is performed dynamically, at run-time, to execute on the target architecture 10 while the target code 21 is running. That is, the translator 19 runs inline with the translated target code 21. Running the subject program 17 through the translator 19 involves two different types of code that execute in an interleaved manner: the translator code 19; and the target code 21. Hence, the target code 21 is generated by the translator code 19, throughout run-time, based on the stored subject code 17 of the program being translated.

In one embodiment, the translator unit 19 emulates relevant portions of the subject architecture 1 such as the subject processor 3 and particularly the subject registers 5, whilst actually executing the subject program 17 as target code 21 on the target processor 13. In the preferred embodiment, at least one global register store 27 is provided (also referred to as the subject register bank 27 or abstract register bank 27). In a multithreaded environment, optionally more than one abstract register bank 27 is provided according to the architecture of the subject processor. A representation of a subject state is provided by components of the translator 19 and the target code 21. That is, the translator 19 stores the subject state in a variety of explicit programming language devices such as variables and/or objects. The translated target code 21, by comparison, provides subject processor state implicitly in the target registers 15 and in memory locations 18, which are manipulated by the target instructions of the target code 21. For example, a low-level representation of the global register store 27 is simply a region of allocated memory. In the source code of the translator 19, however, the global register store 27 is a data array or an object which can be accessed and manipulated at a higher level.

Suitably, the translator 19 divides the subject code 17 into a plurality of translation units or blocks. Commonly, each of these subject code blocks corresponds to one basic block of the subject code. The term "basic block" will be familiar to those skilled in the art. That is, each basic block is a sequential set of instructions between a first instruction at a single entry point and a last instruction at a single exit point (such as a jump, call or branch instruction). Thus, a basic block is a section of code with exactly one entry point and exactly one exit point, which limits the block code to a single control path. For this reason, basic blocks are a useful fundamental unit of control flow. The translator 19 may select just one of these basic blocks (block mode) or select a group of the basic blocks (group block mode). A group block suitably comprises two or more basic blocks which are to be treated together as a single unit. Further, the translator may form iso-blocks representing the same block of subject code but under different entry conditions.

In the preferred embodiments, trees of Intermediate Representation (IR) are generated based on a subject instruction sequence, as part of the process of generating the target code 21 from the original subject program 17. IR trees are abstract representations of the expressions calculated and operations performed by the subject program. Later, the target code 21 is generated ("planted") based on the IR trees. Collections of IR nodes are actually directed acyclic graphs (DAGs), but are referred to colloquially as "trees".

As those skilled in the art may appreciate, in one embodiment the translator 19 is implemented using an object-oriented programming language such as C++. For example, an IR node is implemented as a C++ object, and references to other nodes are implemented as C++ references to the C++ objects corresponding to those other nodes. An IR tree is therefore implemented as a collection of IR node objects, containing various references to each other.

Further, in the embodiment under discussion, IR generation uses a set of register definitions which correspond to specific features of the subject architecture upon which the subject program 17 is intended to run. For example, there is a unique register definition for each physical register on the subject architecture (i.e., the subject registers 5 of FIG. 1). As such, register definitions in the translator may be implemented as a C++ object which contains a reference to an IR node object (i.e., an IR tree). The aggregate of all IR trees referred to by the set of register definitions is referred to as the working IR forest ("forest" because it contains multiple abstract register roots, each of which refers to an IR tree). These IR trees and other processes suitably form part of the translator 19.

FIG. 1 further shows native code 28 in the memory 18 of the target architecture 10. There is a distinction between the target code 21, which results from the run-time translation of the subject code 17, and the native code 28, which is written or compiled directly for the target architecture. In some embodiments, a native binding is implemented by the translator 19 when it detects that the subject program's flow of control enters a section of subject code 17, such as a subject library, for which a native version of the subject code exists. Rather than translating the subject code, the translator 19 instead causes the equivalent native code 28 to be executed on the target processor 13. In example embodiments, the translator 19 binds generated target code 21 to the native code 28 using a defined interface, such as native code or target code call stubs, as discussed in more detail in published PCT application WO2005/008478, the disclosure of which is incorporated herein by reference.

Figure 2A:
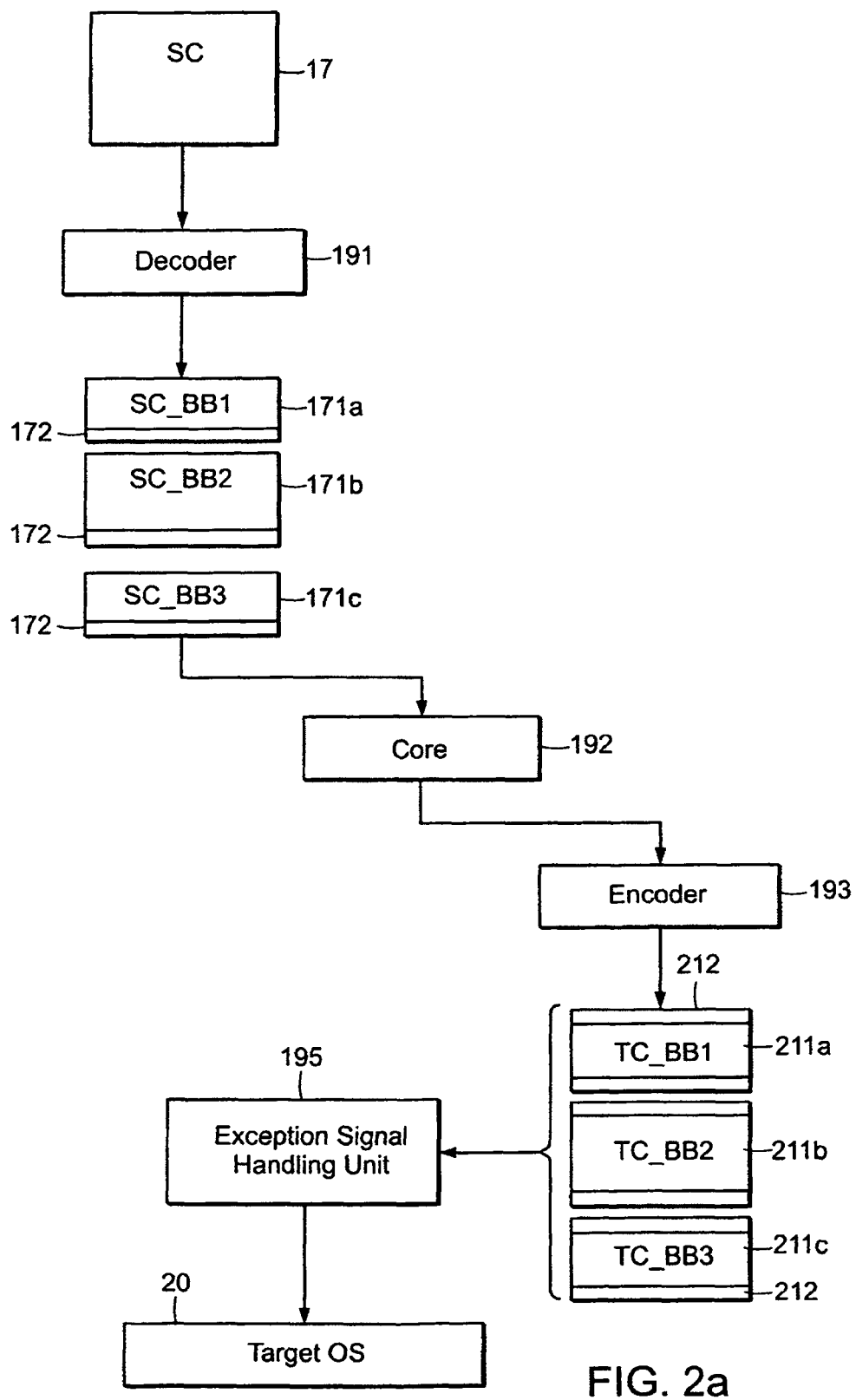
FIG. 2a is a schematic overview of a program code conversion process as employed by embodiments of the present invention.

FIG. 2a illustrates the translator unit 19 in more detail when running on the target computing platform 10. As discussed above, the front end of the translator 19 includes a decoder unit 191 which decodes a currently needed section of the subject program 17 to provide a plurality of subject code blocks 171a, 171b, 171c (which usually each contain one basic block of subject code), and may also provide decoder information 172 in relation to each subject block and the subject instructions contained therein which will assist the later operations of the translator 19. In some embodiments, an IR unit in the core 192 of the translator 19 produces an intermediate representation (IR) from the decoded subject instructions, and optimisations are opportunely performed in relation to the intermediate representation. An encoder 193 as part of the back end of the translator 19 generates (plants) target code 21 executable by the target processor 13. In this simplistic example, three target code blocks 211a-211c are generated to perform work on the target platform 10 equivalent to executing the subject code blocks 171a-171c on the subject platform 1. Also, the encoder 193 may generate control code 212 for some or all of the target code blocks 211a-211c which performs functions such as setting the environment in which the target block will operate and passing control back to the translator 19 where appropriate.

As also shown in FIG. 2a, the translator 19 is arranged to handle faults and other exceptions that are raised during execution of the target code 21. To this end, the translator 19 includes an exception signal handling unit 195.

Figure 2B:
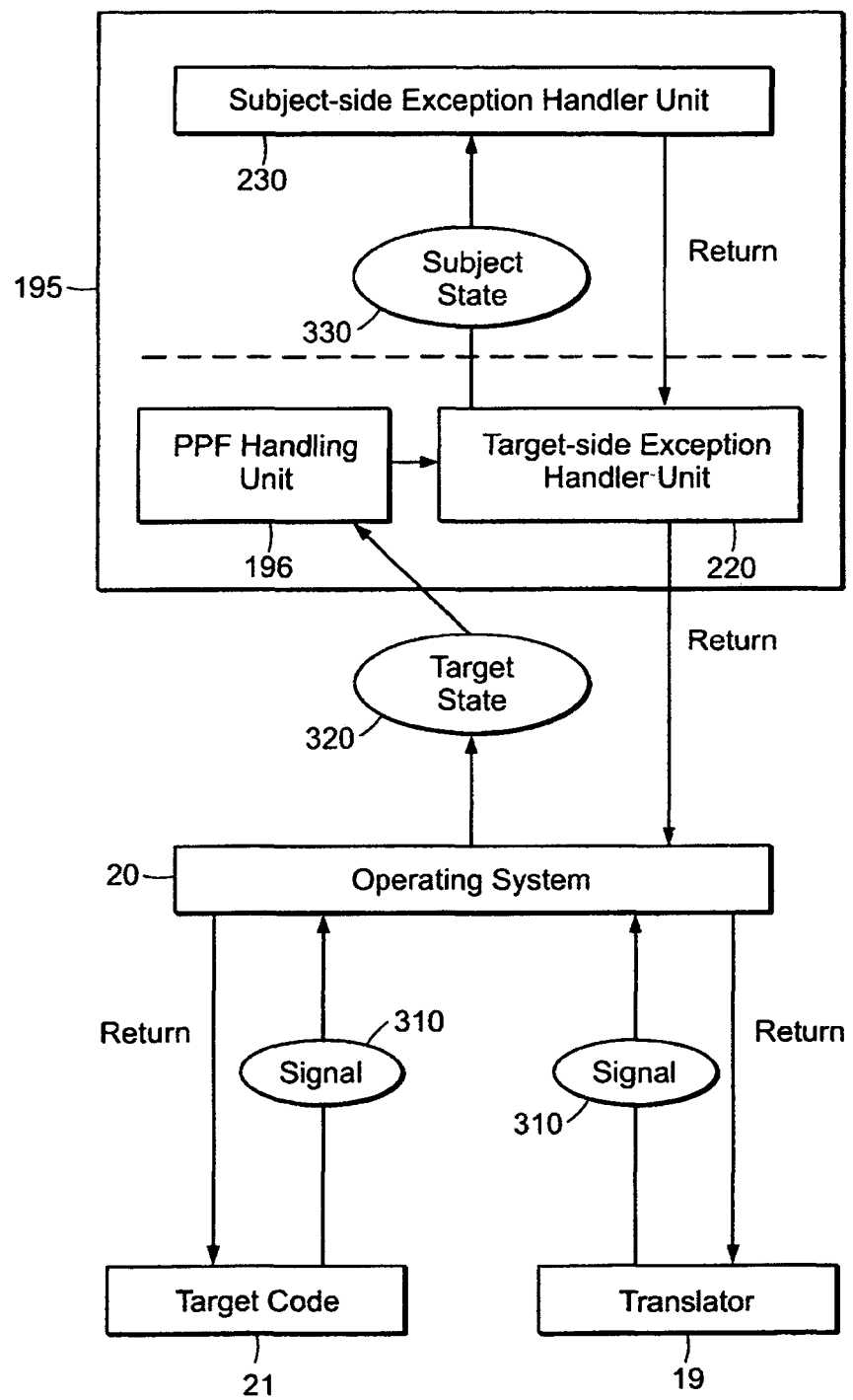
FIG. 2b is a schematic diagram illustrating a translator unit for use in exemplary embodiments of the present invention.

FIG. 2b explains in more detail the subject and target state 320, and the ways in which the exception signal handling unit 195 interacts with the target computing platform to deal with exceptions as appropriate to target and/or subject state 330. A target state 320 represents, generally, the state of execution on the target processor 13. Thus, the target state 320 includes information about any exception signal raised in the target processor 13. Such information is conveniently stored as a SIGINFO data structure provided by the operating system 20. Further, the target state 320 optionally includes more detailed information about in particular the state of the target registers 15, at the point when an exception signal is raised. Such information is conveniently stored as a SIGCONTEXT data structure.

Thus, the exception handling unit 195 uses the target state 320 to examine the state of execution on the target processor 13 at the point when an exception signal 310 occurs. There are various outcomes which can result from handling of an exception signal, depending on the target state 320 when the exception is raised.

In many cases it is possible to resume execution of the target code 21 and/or the translator 19 as appropriate. In particular, the exception handling unit 195 examines the target state 320 to determine the nature and cause of the exception and take appropriate responsive action. The exception handling unit 195 will, if appropriate, modify the target state 320, such as by changing a condition code flag or modifying stored data representing the contents of one or more of the target registers 15, before passing execution control back through the operating system 20 to resume execution according to the original or now-modified target state 320. Thus, execution may resume at the original point where the exception occurred, or may resume at a different point in the code, or in a different way, in response to the conditions which lead to the exception signal.

In particular, an exception may arise during execution of the target code 21 but, after handling the exception, result in a return to execution of the translator 19 because the exception has indicated that the translator 19 now needs to change or regenerate one or more blocks of the target code 21. The exception handling unit 195 handles many such exception signals with reference only to the target state 320 using a target-side exception handler unit 220.

However, some exception signals are not handled with reference to the target state 320 alone. Here, a subject state 330 is provided which represents a state of execution on the emulated subject processor 3, including in particular representative values for the subject registers 5. Suitably, the subject state 330 makes reference to the one or more abstract register banks 27 discussed above. This subject state 330 is then employed by the exception handling unit 195 to handle the exception signal. However, it is relatively costly for the exception handler unit 196 to provide the subject state 330, and thus it is desired to minimise the occasions where the subject state 330 is constructed.

More detailed background information concerning the generation of such a subject state 330 is given in WO2005/006106 entitled "Method and Apparatus for Performing Adjustable Precision Exception Handling", and WO2006/103395 entitled "Method and Apparatus for Precise Handling of Exceptions During Program Code Conversion" referenced above. Notably, these earlier disclosures consider a mechanism to provide the subject state 330 at varying levels of precision for different subject instructions or an efficient mechanism to derive a precise subject state 330 using recovery information, but do not allow for the efficient handling of subject page protection faults arising during operation of the translator 19 on the target computing platform 10 in cases where the subject and target pages are of different sizes to one another.

The exception signal handling unit 195 includes a page protection fault handling unit 196. The page protection fault handling unit 196 receives target state information and works with the target-side exception handling unit 220 to manage attempted accesses of the target memory by the target code 21 so that such memory accesses they are handled in a way consistent with page protection behaviour expected of the subject machine. However, as described below the page protection fault handling unit is arranged to emulate correct subject page protection behaviour when considering subject and target pages of different sizes.

The translator 19 uses the page protection fault handling unit 196 to monitor memory accesses carried out by the target code blocks 211a-211c, and if appropriate the page protection fault handling unit 196 generates a page protection fault in accordance with the expected operation of the corresponding portion of subject code when run on subject processor 3.

Figure 3:
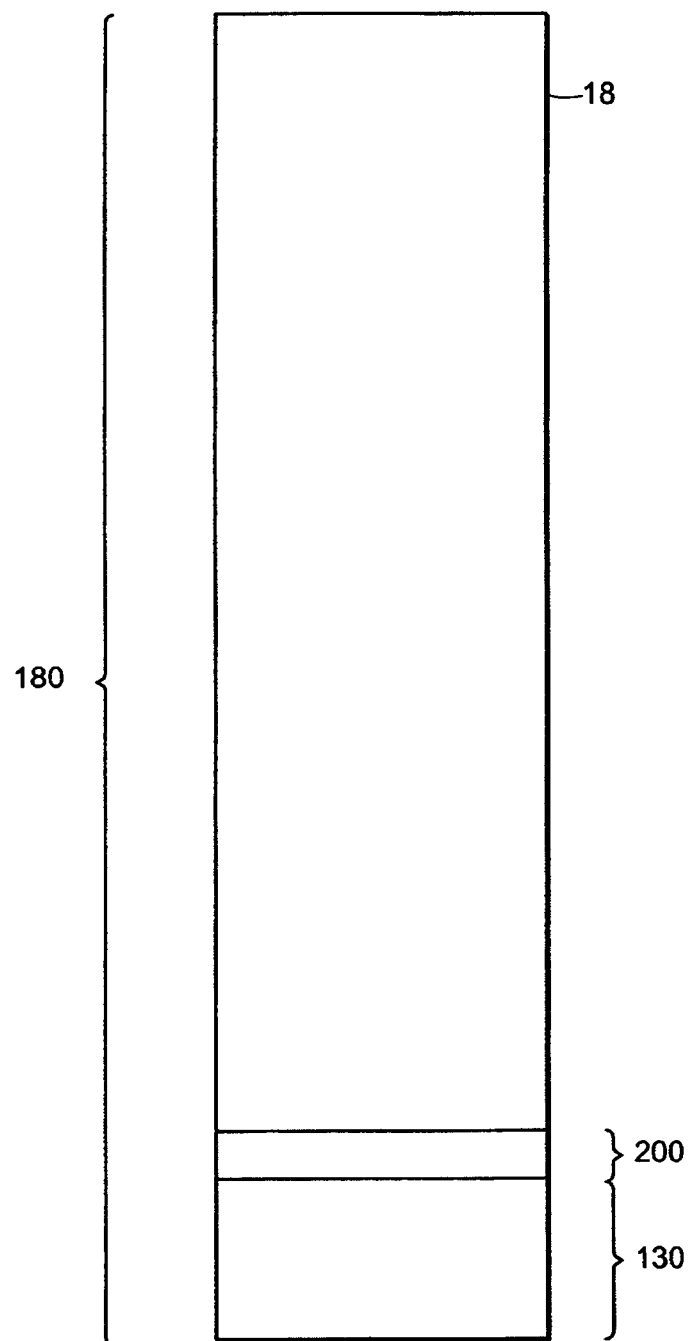
FIG. 3 is a schematic diagram illustrating parts of an exemplary computing system relating to page protection fault handling.

FIG. 3 is a schematic diagram illustrating, in general overview, the target memory 18 accessible by the target processor 13 in the form of a target address space 180. The target memory 18 has sufficient capacity to include a subject address space 130 corresponding to the address space of the memory 8 of subject processor 3. The target memory 18 has further capacity to store a page descriptor store 200. In this embodiment the page descriptor store 200 contains permission information describing the read/write/execute permissions of each page in the subject address space 130 according to a subject page description. The page descriptor store 200 in general terms contains access attributes associated with the corresponding page. The content of the page descriptor store 200 is determined in accordance with the page structure of the subject address space 130, and by the page protection functionality provided for each subject page. The page descriptor store 200 is populated in response to subject system calls that modify memory layout, such as "mmap", "munmap" and "mprotect". As the subject program loads libraries, maps data into memory etc. the page descriptor store is populated and updated appropriately.

In the example embodiment of FIG. 3 there is a direct mapping between pages in the subject address space 130 and the corresponding entries in the page descriptor store 200, meaning that from a given address in the subject address space 130 it is possible for the page protection fault handling unit 196 to ascertain the corresponding entry in the page descriptor store 200 to determine the corresponding subject page description.

In this example embodiment each entry in the page descriptor store 200 includes three pieces of information describing the permission characteristics of the corresponding subject page. The three pieces of information determine whether the page is (a) readable, (b) writable and (c) executable and are referred to as a read inhibit (RI), a write inhibit (WI) and an execute inhibit (XI) bit respectively. In the example embodiments described, setting the RI, WI or XI bits to a logic one indicates that the permission is denied, whereas clearing the RI, WI or XI bits to a logic zero indicates that the permission is granted.

Figure 4:
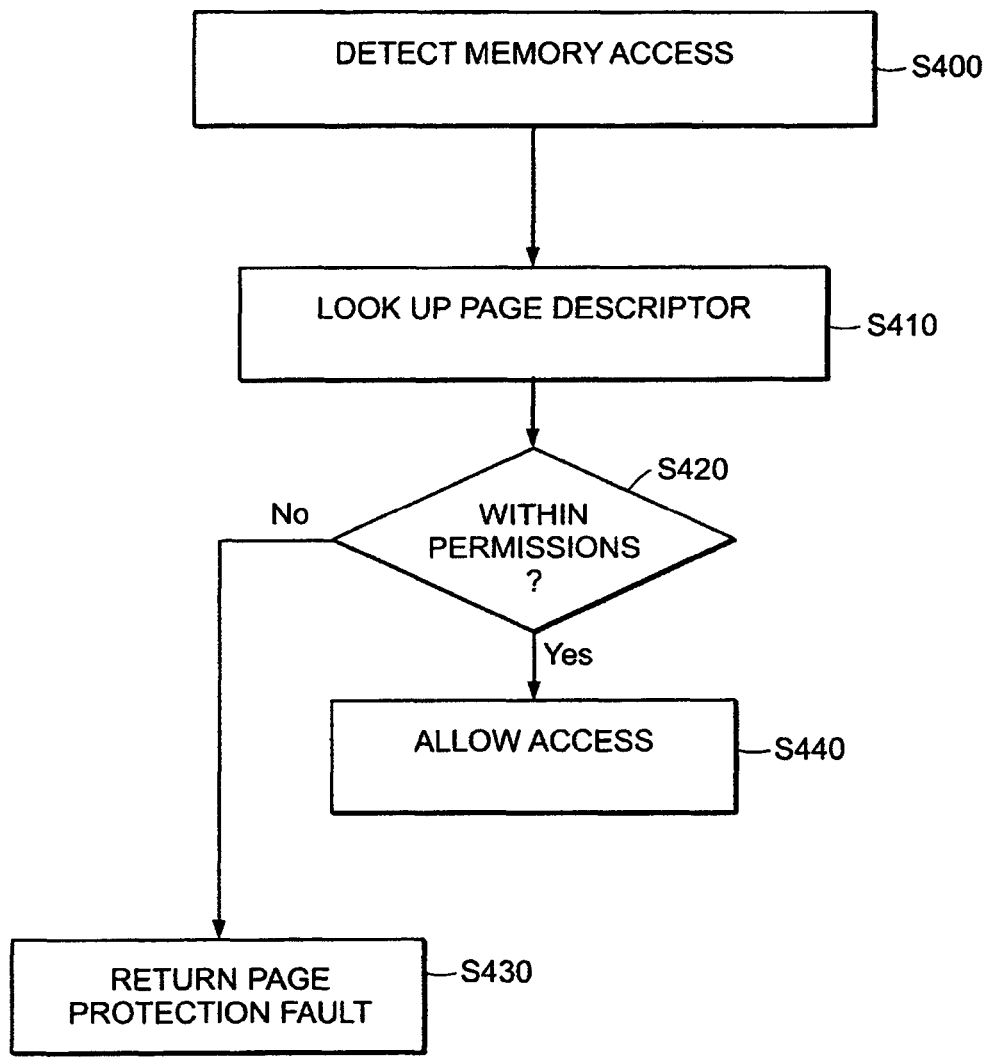
FIG. 4 is a schematic flow diagram illustrating a method of page protection fault handling according to an exemplary embodiment.

FIG. 4 is a schematic diagram illustrating, in general overview, a method by which the page protection fault handling unit 196 operates. The page protection fault handling unit 196 detects an attempt to access a memory location in the subject address space 130 (S400). The page protection fault handling unit 196 looks up the page descriptor of the memory location in question in the page descriptor store 200 (S410). The page protection fault handling unit 196 checks whether the attempted access is within the scope of permissions for the memory location in question (S420). If the permissions indicate that the access is allowed the page protection fault handling unit 196 allows the memory access to take place (S430). Otherwise, if the permissions indicate that the access is not allowed the page protection fault handling unit 196 inhibits the access and returns a page protection fault information to the translator 19 (S440).

The example embodiments described herein make use of the exception signal handling unit 195 in the detection of an attempted memory access, however, other mechanisms may also be used. For example, explicit software checks may be inserted into the target code that branch to a handler routine if the result of the explicit checks indicates that the permissions are insufficient for the attempted access.

Figure 5:
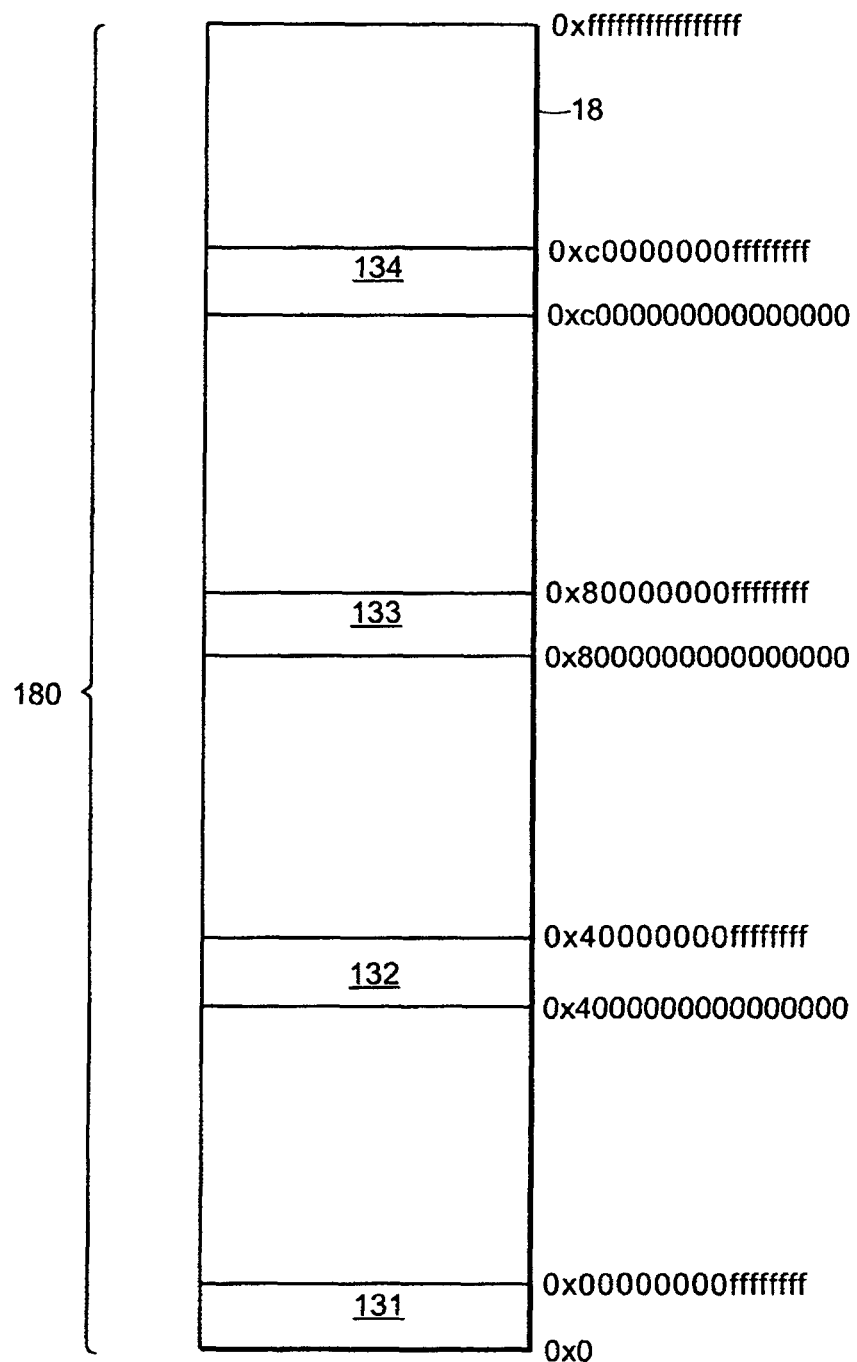
FIG. 5 is a another schematic diagram illustrating parts of an exemplary computing system relating to page protection fault handling.

FIG. 5 is a schematic diagram illustrating in more detail an example embodiment of data structure that is used by the page protection fault handling unit 196. This embodiment is described in relation to subject code written for execution on a 32 bit platform, on which a page size of as small as 4 kB is provided for. Furthermore, this embodiment is described in relation to a 64 bit target processor which provides for a page size only as small as 64 kB.

FIG. 5 shows the target address space 180. Within the target address space 180 is a portion of memory 131 that provides a representation of the subject address space 130. Also shown are three further portions of memory 132-134 which are guard representations of the subject address space. The three guard representations of the subject address space 132-134 correspond in address-range size to the portion of memory 131, but are offset there-from. The offset of each guard representation of the subject address space 132-134 is determined by manipulating the two highest order address bits, with the values of the two highest order bits chosen according to page protection information for each subject page. The content of the two highest order address bits can be used by the page protection fault handling unit 196 to distinguish four different page protection conditions. The two highest order bits are conveniently manipulated according to the page descriptor information in the page descriptor store. In the example of FIG. 5, in total four representations of the subject address space are provided by using the two highest order address bit.

By including information from the page descriptor store across the high order address bits and thereby forming multiple guard representations of the subject address space, the task of the page protection fault handling unit in detecting and handling page protection faults is made simple and can be performed efficiently. The page protection fault handling unit 196 sets up the guard representations of the subject address space to occupy pages identifiable in the target hardware as inaccessible. Any attempts to access the guard representations generate a target exception signal, for example a target segmentation fault. The exception signal handling unit 195 detects the segmentation fault and passes fault information, including the address giving rise to the fault to the page protection fault handling unit 196. The page protection fault handling unit 196 examines the high order bits of the faulting address to determine the nature of the page fault that would occur, according to subject page protection permissions and continues the operation of the translator as appropriate to the subject page protection permissions.

In more detail, a target segmentation fault is generated and indicates that an error has occurred when a program attempts to access memory in a way that is not allowed (e.g. by carrying out any attempt to access one of the guard representations of the subject address space). On POSIX-type systems the symbolic constant for this type of fault is normally SIGSEGV. Such segmentation faults are used to trap and detect when the target code 21 is attempting to access the guard subject address space, and then the segmentation fault signal is handled by invoking the page protection fault handling unit to correctly deal with the fault by referring to the representation of the subject page permissions encoded into the faulting target address.

FIGS. 6a-6e are schematic diagrams illustrating in more detail further example embodiments of data structures that enable the page protection fault handling unit 196 to perform the operations of FIG. 4 in a reliable and efficient manner. In common with the data structure of FIG. 5, FIGS. 6a-6e are described in relation to subject code written for execution on a 32 bit platform, on which a page size of as small as 4 kB is provided for. The data structures described enables the page protection fault handling unit 196 to handle page protection information in accordance with the permissions specifiable on an Intel™ x86 processor. In this embodiment the target processor is an IBM™ 64 bit Power PC processor.

FIG. 6a shows the structure of a page descriptor 210 made up of three bits. The three bits of the page descriptor 210 are: a read inhibit bit 211; a write inhibit bit 212; and an execute inhibit bit 213. If the read, write or execute inhibit bits are set in a page descriptor associated with a memory location they respectively indicate it is not permitted to read, write or execute the data stored at the memory location.

FIG. 6b shows an example of a page descriptor 210 in which only the execute inhibit bit 213 is set, meaning that read and write accesses of the memory location associated with this page descriptor are permitted, but execution is not permitted. In contrast, FIG. 6c shows an example of a page descriptor 210 in which both the write inhibit bit 212 and the execute inhibit bit 213 are set, meaning that read access is permitted but writing to and execution of the memory location associated with this page descriptor are not permitted.

As described above in relation to FIG. 5, adding the page description information into high order address bits provides a convenient way of allowing the page protection fault handling unit 196 to determine when a potentially restricted memory access is being attempted. The use of the page descriptor 210 in determining whether a memory access is permitted is now described in relation to the contrasting page descriptors of FIGS. 6b and 6c. For example, if the translator 19 attempts to write to a location in the subject address space at 0x8048000, the content of the write inhibit bit 212 from the relevant page descriptor is copied into the second highest order bit in the target address.

In the case of an address associated with the page descriptor of FIG. 6b, a zero is copied into the second highest order bit (as shown in FIG. 6d), and the write continues as normal. However, if the address is associated with the page descriptor of FIG. 6c a one is copied into the second highest order bit in the target address (as shown in FIG. 6e), meaning that when the write is performed it is to a guard representation of the subject address space. The guard representation of the subject address space is set up in an area of target memory 18 that cannot be written to, and therefore a target segmentation fault is generated. The target segmentation fault is dealt with by the page protection fault handling unit 196, which first clears the high order bits and then passes the fault on to be dealt with by the target-side exception handler unit 220. Before the fault is passed on the page protection fault handling unit 196 clears the high order address bits so that the address returns to a proper representation of the relevant subject address, thereby making the page protection behaviour transparent from the point of view of the target-side exception handler unit 220.

Figure 7:
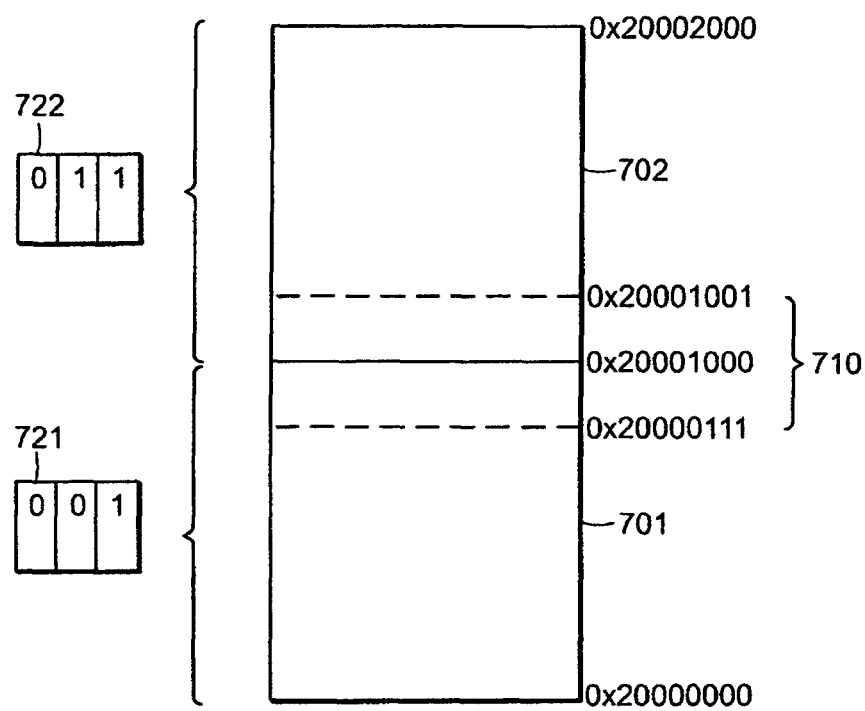
FIGS. 7-10 are schematic diagrams illustrating still further parts of an exemplary computing system relating to page protection fault handling.

A code example detailing the operation of a load from a subject address as described above now follows:
Inputs:
r3: subject address
r21: page descriptor table pointer
Page Descriptor Format:
+--+--+--+
|RI|WI|XI|
+--+--+--+
rlwinm r4, r3, 24, 12, 31;extract the page descriptor index
lbzx r4, r21, r4;load the page descriptor
andi. r4, r4, 4;extract the RI
rldimi r3, r4, 61, 0;insert inhibit bits into address
lwbrx r3, r0, r3; perform load from the address The above examples detail the operation of example embodiments when accessing a single address. However, it is common for memory accesses to span multiple addresses, including address ranges which cross one or more page boundaries. If the page descriptors of the memory locations accessed in this way differ between pages then the page protection fault handling unit should identify this and correctly deal with the memory access according to the page descriptors of all pages involved. For example, FIG. 7 shows a region of memory comprising a first page 701 and a second page 702. The page descriptors 721,722 associated with the first and second pages 701,702 are also shown. If a write to the memory region 710 is undertaken, a check of the page descriptor 721 associated with the page where the write starts indicates that the write is permitted. However, the end portion of the write involves writing to the page 702 where writing is not permitted, so the correct behaviour of the page protection fault handling unit 196 is to raise a page protection fault when the write moves to the page that is identified as write inhibited.

A first embodiment of page protection fault handling unit capable of dealing with cross page boundary accesses is now described. This embodiment uses page descriptors of the form shown in FIG. 6a, in which page protection bits set to logic ones indicate the inhibition of access. The page protection fault handling unit 196 obtains page descriptors for all of the areas involved in the access and combines them into a composite page protection descriptor. In this first embodiment the combination is performed as the logical OR operation, so that if any of the inhibit bits are set to logic one for any of the pages then the composite descriptor contains logic ones where appropriate. At the start of the access the page protection fault handling unit 196 raises a target segmentation fault if any of the page protection bits relevant to that access indicate that the access is not permitted. The target segmentation fault is dealt with by the target-side exception handler unit 220, after the page protection fault handling unit 196 has first cleared the high order bits according to the parts of the access and the original page descriptors.

Figure 8A:
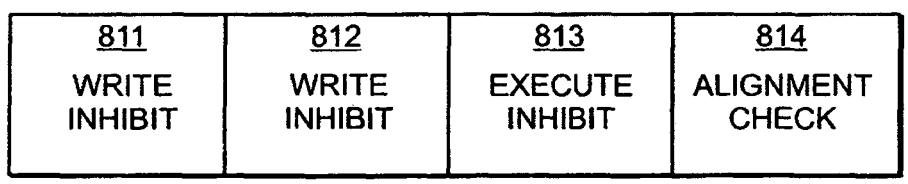

A code example detailing the operation of a load from a subject address range including checking for and combining page descriptors now follows:
Inputs:
r3: subject address
r21: page descriptor table pointer
Page Descriptor Format:
+--+--+--+
|RI|WI|XI|
+--+--+--+
rlwinm r4, r3, 24, 12, 31;extract the page descriptor index
lbzx r4, r21, r4;load the first byte's descriptor
addi r5, r3, 3;calculate the last byte accessed
rlwinm r5, r5, 24, 12, 31;extract the page descriptor index
lbzx r5, r21, r5;load the last byte's descriptor
andi. r4, r4, 4;extract the READ INHIBIT bit
rldimi r3, r4, 61, 0;insert inhibit bits into address
lwbrx r3, r0, r3;perform the load from address A second embodiment of page protection fault handling unit capable of dealing with cross page boundary accesses is now described. This embodiment uses page descriptors of the form shown in FIG. 8a, in which the read, write and execute inhibit bits of FIG. 6a are used in conjunction with alignment checking (AC) portion for storing AC data.

In this embodiment the AC data is generated and stored in the AC portion of the page descriptor after the page descriptor for a memory access is loaded. The AC portion of the page descriptor is a reserved space that is conveniently set aside for storing the AC data when generated for a relevant memory access, and which as will be appreciated from the following description enables the AC data to be used efficiently in page protection fault handling. The AC data is used to avoid one of the page descriptor lookup steps described above and shown in the preceding code example.

By reducing the number of page descriptor lookups to only a single lookup overall efficiency of the page protection fault handling unit is improved.

The alignment checking data is generated based on the subject page size, the size of the subject memory access and the start address of the access. If the page size minus the access size is smaller than the distance from the start of the page to the start address of the access then the access will cross a page boundary. This condition is expressed below in Equation 1

$$\text{CrossPage} = (\text{Pgsz} - \text{AccSz}) < (\text{Addr} \, \& \, (\text{Pgsz} - 1)) \qquad \text{Equation 1}$$

In which
Pgsz=subject page size in bytes
Accsz=size of subject access in bytes
Addr=subject address of access The value of the subject page size is invariant. In the Intel™ x86 subject processor described in these examples the subject page size is 4 kB (0x1000 bytes). Three examples employing Equation 1 are given below.

Example 1: 32 Bit Load from 0x20000000

$$CrossPage = (0x1000 - 0x4) < (Addr \, \& \, (0x1000 - 1))$$
$$= 0xffc < (0x20000000 \, \& \, 0xfff)$$
$$= 0xffc < 0x0$$
$$= \text{false (no alignment exception raised)}$$

Example 2: 32 Bit Load from 0x20000ffe $$CrossPage = (0x1000 - 0x4) < (Addr \, \& \, (0x1000 - 1)) =$$
$$0xffc < (0x20000ffe \, \& \, 0xfff) =$$
$$0xffc < 0xffe = \text{true (alignment exception raised)}$$

A code fragment detailing the operation of a 32 bit load such as the load of Example 2, including generating an alignment checking bit now follows:
Inputs:
r3: subject address
r21: page descriptor table pointer
Page Descriptor Format:
+--+--+--+--+
|RI|WI|XI|AC|
+--+--+--+--+
rlwinm r4,r3,24,12,31;extract the descriptor store index
lbzx r4,r21,r4;load the descriptor entry
andi. r5,r3,0xfff ;calculate the access' offset into the subject page
subfi r5,r5,0xffc ;calculate the alignment condition(-ve indicates cross page)
rlwimi r4,r5,1,31,31;insert the alignment condition's sign into the AC field
and. r4,r4,9;mask out everything but the RI and AC bits
rldimi r3,r4,60,0;insert the inhibition bits into the target address
lwbrx r3,r0,r3;perform the 32 bit load To increase efficiency the code example above uses a subtraction operation rather than a compare operation, with the sign of the subtraction result corresponding to the cross page condition generated by the compare operation. The alignment checking data for the attempted memory access is stored in the AC portion of the relevant page descriptor and used to raise a cross-page alignment exception if appropriate for the attempted memory access. In this case the 32 bit load specified by the final instruction lwbrx of the above example will fail, as the page protection fault handler will detect the AC data in the high order bits of the target address and in this case inhibit the load in accordance with the AC data.

Example 3: 16 Bit Load from 0x20000ffe $$Crosspage = (0x1000 - 0x2) < (Address \, \& \, (0x1000 - 1)) =$$
$$0xffe < (0x20000ffe \, \& \, 0xfff) =$$
$$0xffe < 0xffe = \text{false (no alignment exception raised)}$$

A code fragment detailing the operation of a 16 bit load such as the load of Example 3, including generating an alignment checking bit, now follows:
Inputs:
r3: subject address
r21: page descriptor table pointer
Page Descriptor Format:
+--+--+--+--+
|RI|WI|XI|AC|
+--+--+--+--+
rlwinm r4,r3,24,12,31;extract the descriptor store index
lbzx r4,r21,r4;load the descriptor entry
andi. r5,r3,0xfff ;calculate the access' offset into the subject page
subfi r5,r5,0xffe ;calculate the alignment condition (-ye indicates cross page)
rlwimi r4,r5,1,31,31;insert the alignment condition's sign into the AC field
and. r4,r4,9;mask out everything but the RI and AC bits
rldimi r3,r4,60,0;insert the inhibition bits into the target address
lhbrx r3,r0,r3;perform the 16 bit load Again, to increase efficiency the code example above uses a subtraction operation rather than a compare operation, with the sign of the subtraction result corresponding to the cross page condition generated by the compare operation. The alignment checking data for the attempted memory access is stored in the AC portion of the relevant page descriptor and used to raise a cross-page alignment exception if appropriate for the attempted memory access. In this case the 16 bit load specified by the final instruction lhbrx of the above example will not fail, as the page protection fault handler will detect the AC data in the high order bits of the target address and in this case allow the load in accordance with the AC data.

As described above, in this embodiment the AC portion of the page descriptor is not populated with data when the page descriptor is set up; it is reserved space for the AC data for the attempted memory access to be inserted into after the AC data has been calculated for the attempted memory access.

A third embodiment of page protection fault handling unit capable of dealing with cross page boundary accesses is now described. This embodiment uses page descriptors of the form shown in FIG. 8a, in which the read, write and execute inhibit bits of FIG. 6a are again provided with space for alignment checking data.

In this embodiment the alignment checking bit of each page descriptor is populated with a cross-page permission change flag. The cross-page permission change flag is inserted into the page descriptor when the page descriptor is set up based on a comparison between the page permissions and the permissions of the following page. The cross-page permission change flag is used to indicate whether the permissions of a page are the same as the permissions of the following page. In this embodiment the cross-page permission change flag is set to logic one for a page if the following page has different permissions, and is set to logic zero if the following page has the same permissions.

In this embodiment the page protection fault handling unit 196 checks whether an attempted memory access crosses a page boundary, for example using Equation 1. The result of Equation 1, indicating whether or not an attempted memory access does cross a page boundary can be compared with the cross-page permission flag to determine whether or nor the attempted memory access should result in a page protection fault.

Figure 9:
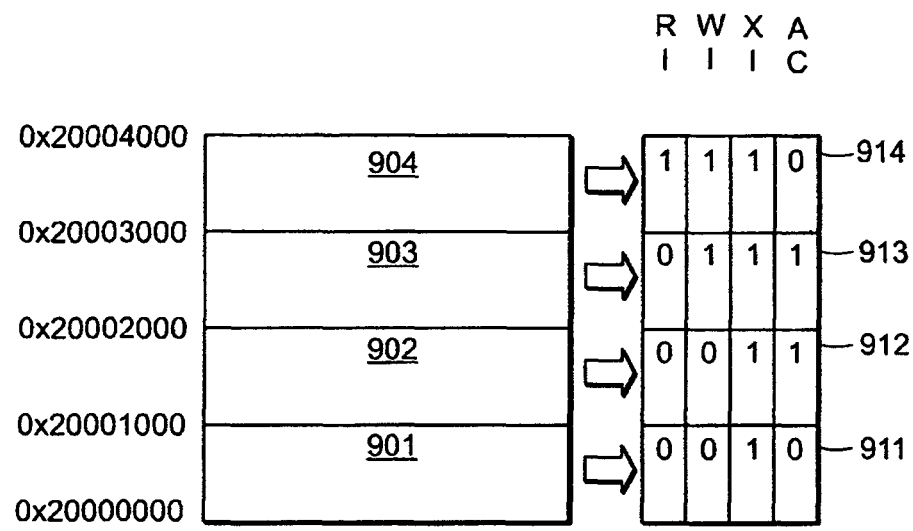

FIG. 9 shows an example of a page structure and associated page descriptors referred to by the third embodiment of the page protection fault handling unit 196. The pages of memory 901-904 each have a corresponding page descriptor 911-914. The cross-page permission change flag is set in page descriptor 912, indicating that the permissions of page 903 differ from those of page 902. Similarly, the cross-page permission change flag is set in page descriptor 913, indicating that the permissions of page 904 differ from those of page 903. In contrast the cross-page permission change flag is clear in page descriptors 911 and 914, indicating that the permissions of page 901 and 904 are the same as those of the respective following pages.

An attempt to make a 4 byte access starting at 0x20000ffe requires examination of the permissions of page 901 and page 902. In this embodiment page protection fault handling unit evaluates Equation 1 to generate an alignment check bit indicating that the attempted access does cross a page boundary. The result of Equation 1 is a 1, and the page protection fault handling unit now combines the cross-page permission change flag with the alignment check bit, for example using a logical AND operation. The result of the combination is a logic zero, which is inserted into the alignment check bit of the page descriptor 911 and the access continues contingent on the other bits in the page descriptor.

In attempt to make a corresponding 4 byte access starting at 0x20001ffe will again result in a 1 being generated for the alignment check bit, but in contrast to the attempted access above, when this bit is combined with the cross-page permission change flag of page descriptor 912 a logic one is generated as output of the logical AND operation. The result of the combination is inserted into the alignment check bit in the page descriptor 912, and when the attempted access continues the page protection fault handling unit will receive and deal with a target segmentation fault. On receiving the fault the page protection fault handling unit will consider the relevant read, write or execute inhibit bit of the page including the start address and the relevant read, write or execute inhibit bit of the following page when determining whether to allow the access to proceed and what fault information to pass to the target-side exception handler 220.

A code example detailing the operation of a load including performing a page boundary crossing check and combining result with a cross-page permission change flag now follows:

Inputs:
r3: subject address
R21: page descriptor table pointer
Page Descriptor Format:

```
+--+--+--+--+
|RI|WI|XI|AC|
+--+--+--+--+
rlwinm r4, r3, 24, 12, 31 ;extract the page descriptor index
lbzx r4, r21, r4 ;load the page descriptor
andi. r5, r3, 0xfff ;extract the offset into the page
subfi r5, r5, 0xffc ;create the alignment condition
li r6, 8 ;create a read inhibit mask
rlwimi r6, r5, 1, 31, 31 ;insert the alignment mask bit
and r4, r4, r6 ;mask out the page descriptor
rldimi r3, r4, 60, 0 ;insert inhibit bits into address
lwbrx r3, r0, r3 ;perform the load from address
```

In addition to dealing with page faults relating to page protection permissions, the page protection fault handling unit 196 is able to deal with page faults relating to shared memory. Shared memory enables the same physical memory regions to be accessed by more than one process, so that changes to the contents of a shared memory region made by one process are visible to the other processes sharing that memory region. Typically operating systems place constraints on the mapping of shared memory regions in order to maintain stability and increase efficiency. For example, under the Linux™ operating system the regions of mapped memory must be aligned on page boundaries and the mapping must be made in multiples of page size. Embodiments of the present invention conveniently allow shared memory regions to be established and used within the constraints of the target processor and its operating system, even if there are differences between the constraints of the target processor/operating system and the constraints of the subject processor in relation to the page structure required of shared memory regions. The page protection fault handling unit deals with subject shared memory mapping requests as described in more detail below.

Figure 10:
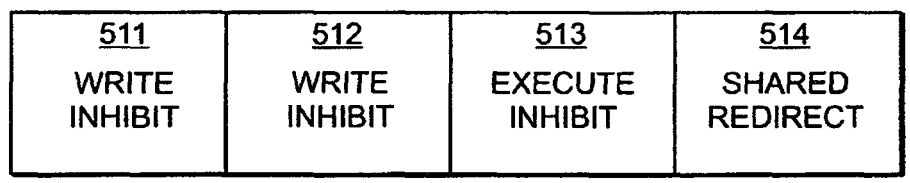

FIG. 10 shows the structure of a page descriptor 510 made up of four bits. The four bits of the page descriptor 510 are: a read inhibit bit 511; a write inhibit bit 512; and an execute inhibit bit 513 corresponding to those described above, and in addition a shared redirect bit 514. If the shared redirect bit is set in a page descriptor 510 associated with a memory location it indicates that the memory location is part of a shared memory space.

When the subject code makes a request for a shared mapping of a memory region the page protection fault handling unit 196 maps the region to a part of the target address space and sets the shared redirect bits and inhibit bits in the page descriptors to allow a efficient use of the target processor in controlling shared access to target memory corresponds to shared subject pages.

Five examples of mapping of subject memory regions into the target memory will now be described. These examples show how the shared redirect (SR) bit works with the inhibit bits described above to efficiently coordinate shared access to the target memory in accordance with the associated subject page protection behaviour.

In the first example a region of private (i.e. not shared) subject memory is to be mapped. The region of subject memory has a start point and size that correspond directly to a valid start point and size in the target memory. For example, if the target memory operates with pages of 64 kB size which are aligned on boundaries at multiples of 64 kB, a subject memory of 4 kB page size which has pages aligned on boundaries at multiples of 4 kB it is apparent that a directly corresponding mapping is possible. In this mapping the relevant read, write and execute inhibit bits are set in the page descriptor store, according to the required access attributes for the subject memory region.

In the second example, a region of shared subject memory is to be mapped. As in the first example above, the region of subject memory has a start point and size that correspond directly to a valid start point and size in the target memory. In this mapping again the relevant read, write and execute inhibit bits are set in the page descriptor store, according to the required access attributes for the subject memory region. The access coordination mechanism provided by the target processor is used to administer accesses to the shared memory.

In the third example, a region of private (i.e. not shared) subject memory is to be mapped. The region of subject memory to be mapped has a start point and size that do not correspond directly to a valid start point and size in the target memory. In this mapping the target memory sets up a larger allocation according to its own page size and start point requirements, the larger allocation containing the whole of the subject region of interest. The relevant read, write and execute inhibit bits are set in the page descriptor store, according to the required access attributes for the subject memory region, with the target memory locations allocated beyond those required by the subject mapping having all accesses inhibited.

In the fourth example, a region of shared subject memory is to be mapped. As in the third example above, the region of subject memory to be mapped has a start point and size that do not correspond directly to a valid start point and size in the target memory. In this mapping the target memory sets up a larger allocation according to its own page size and start point requirements, the larger allocation containing the whole of the subject region of interest. The relevant read, write and execute inhibit bits are set in the page descriptor store, according to the required access attributes for the subject memory region, with the target memory locations allocated beyond those required by the subject mapping having all accesses inhibited, and the access coordination mechanism provided by the target processor is used to administer accesses to the shared memory.

The third example above may lead to a situation in which a region of shared subject memory is to be mapped into a region that in the target memory has already been allocated to subject private memory as a result of the prior allocation of a larger than required target region in order to accommodate the required subject mapping. In the fifth example, a region of shared subject memory is to be mapped into a region that is already mapped as private. The SR bits of the previously allocated target memory are set, and used by the page protection fault handler to redirect attempted accesses to the shared region to a corresponding shared region mapped in elsewhere in the target memory. Ideally, the corresponding shared region is mapped in to the target memory in a manner corresponding to the second or fourth examples described above.

Figure 11A:
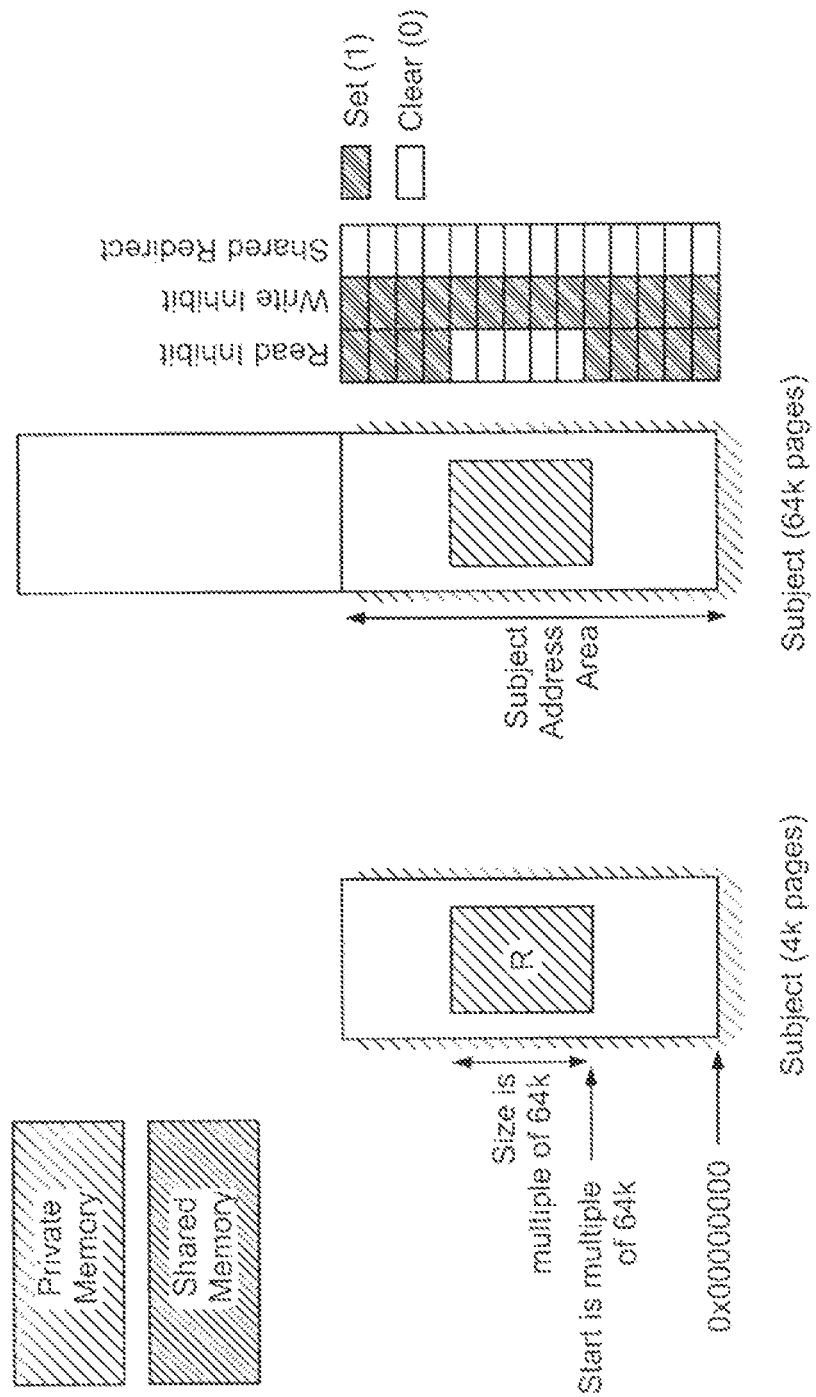
FIGS. 11a-11e are schematic diagrams illustrating a shared redirect fault and handling thereof by an exemplary computing system.

FIGS. 11a-11e illustrate these five examples in more detail. In FIG. 11a the memory to be mapped is private to a particular process and the subject start address and size are valid on the target, then the precise region required is mapped into the target, and page descriptors for the newly accessible pages are set to allow the appropriate access (read-only, in this example).

Figure 11B:
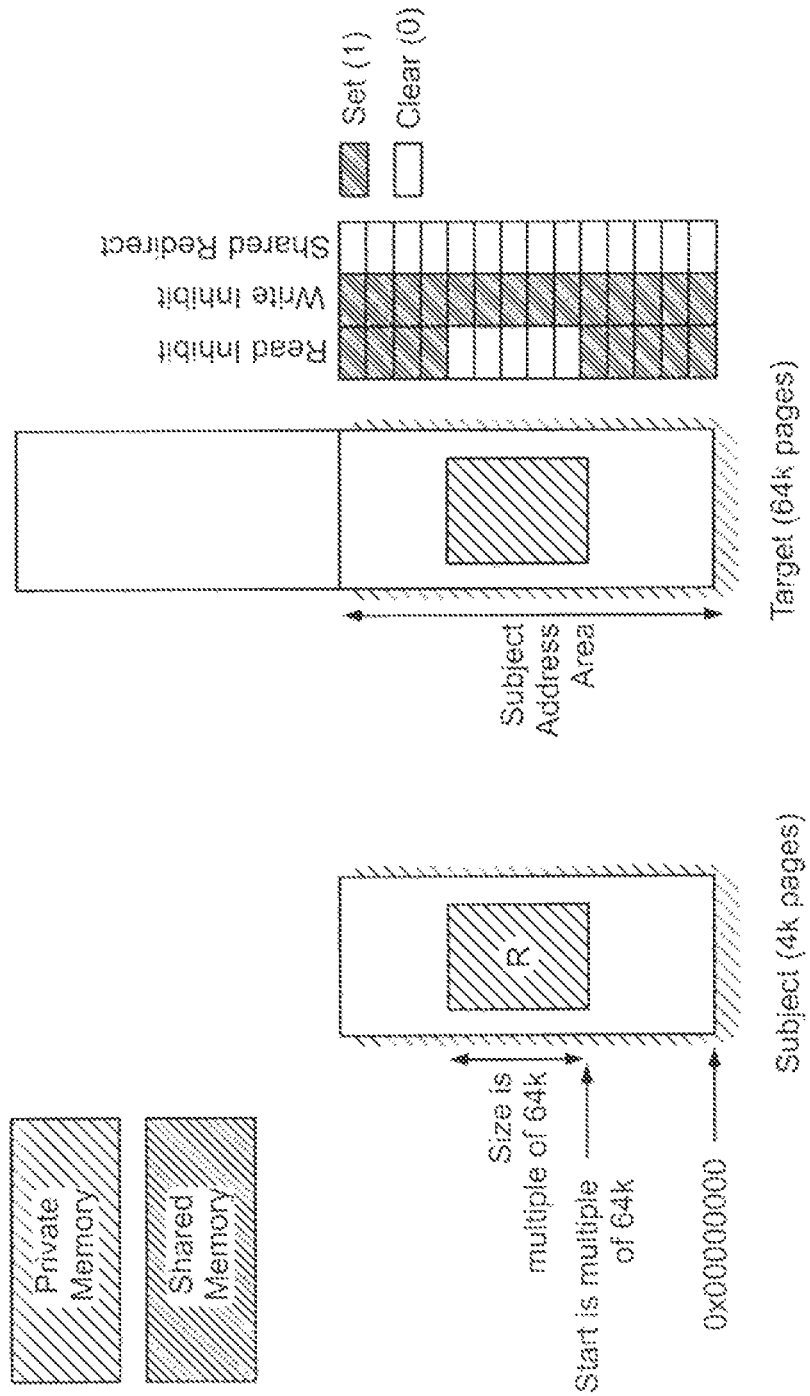

In FIG. 11b shared memory is required, but the mapping is of a size and position that is suitable for the target system. The mapping is handled in the same way as private memory would be.

Figure 11C:
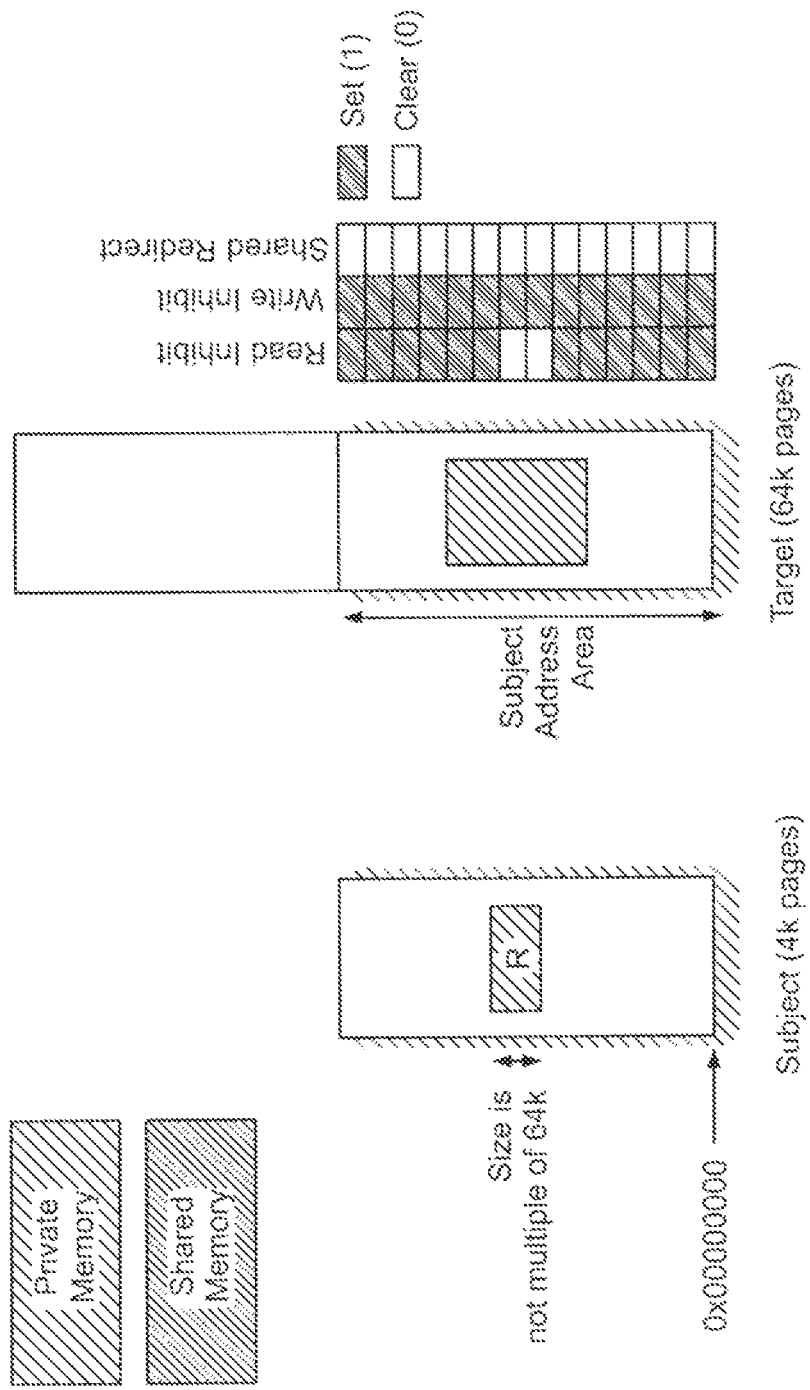

In FIG. 11c parts of the mapped region are unmapped (or it does not fit within the constraints of the target page size in the first place), so the allocation made by the target is larger than is needed by the subject. The page protection bits ensure that access to memory in this area behaves as expected by the subject.

Figure 11D:
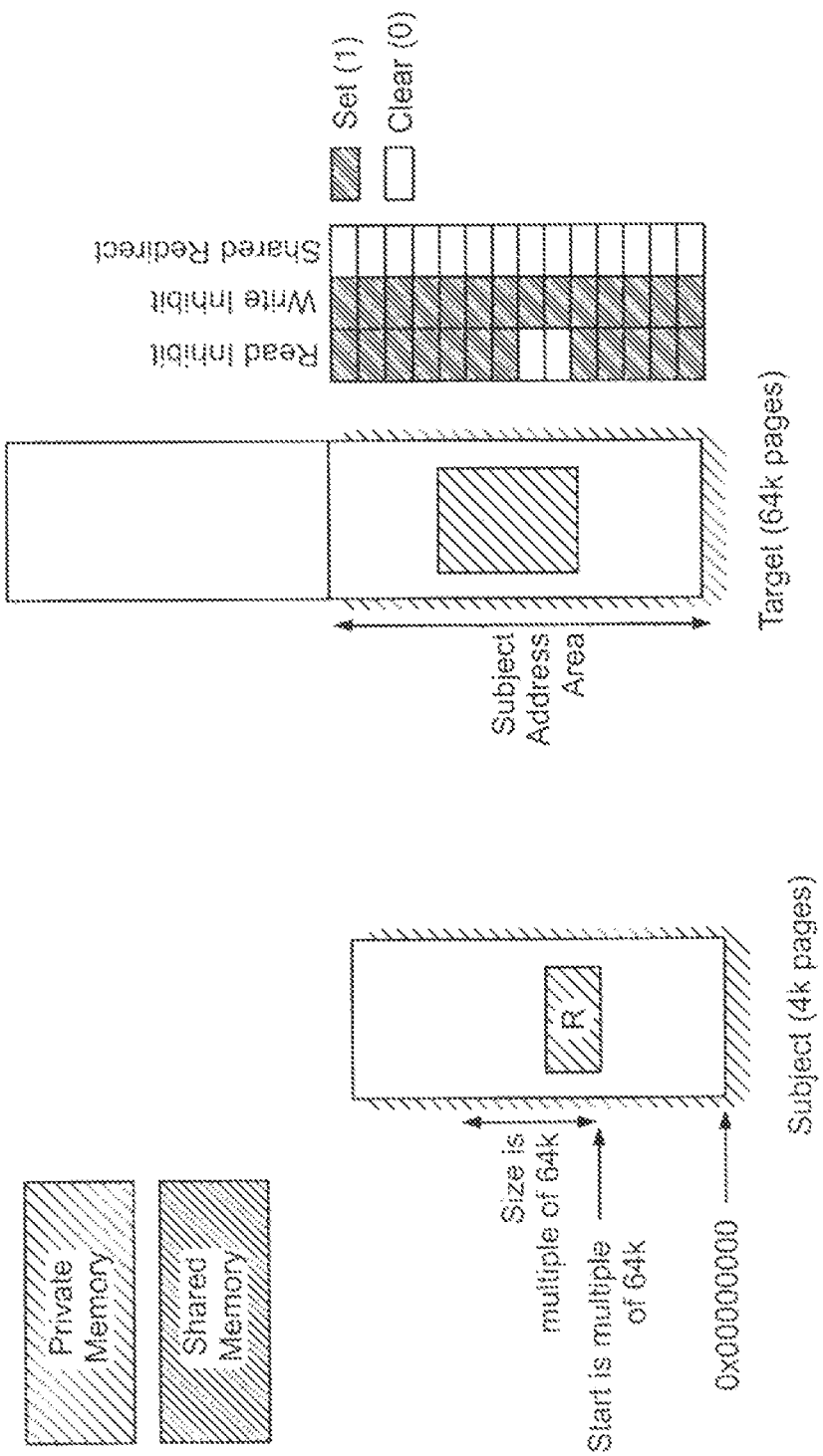

In FIG. 11d some of the shared memory is unmapped. This memory is treated the same as private memory. The page descriptors are updated to stop accesses outside the area that the subject machine thinks is still mapped in.

Figure 11E:
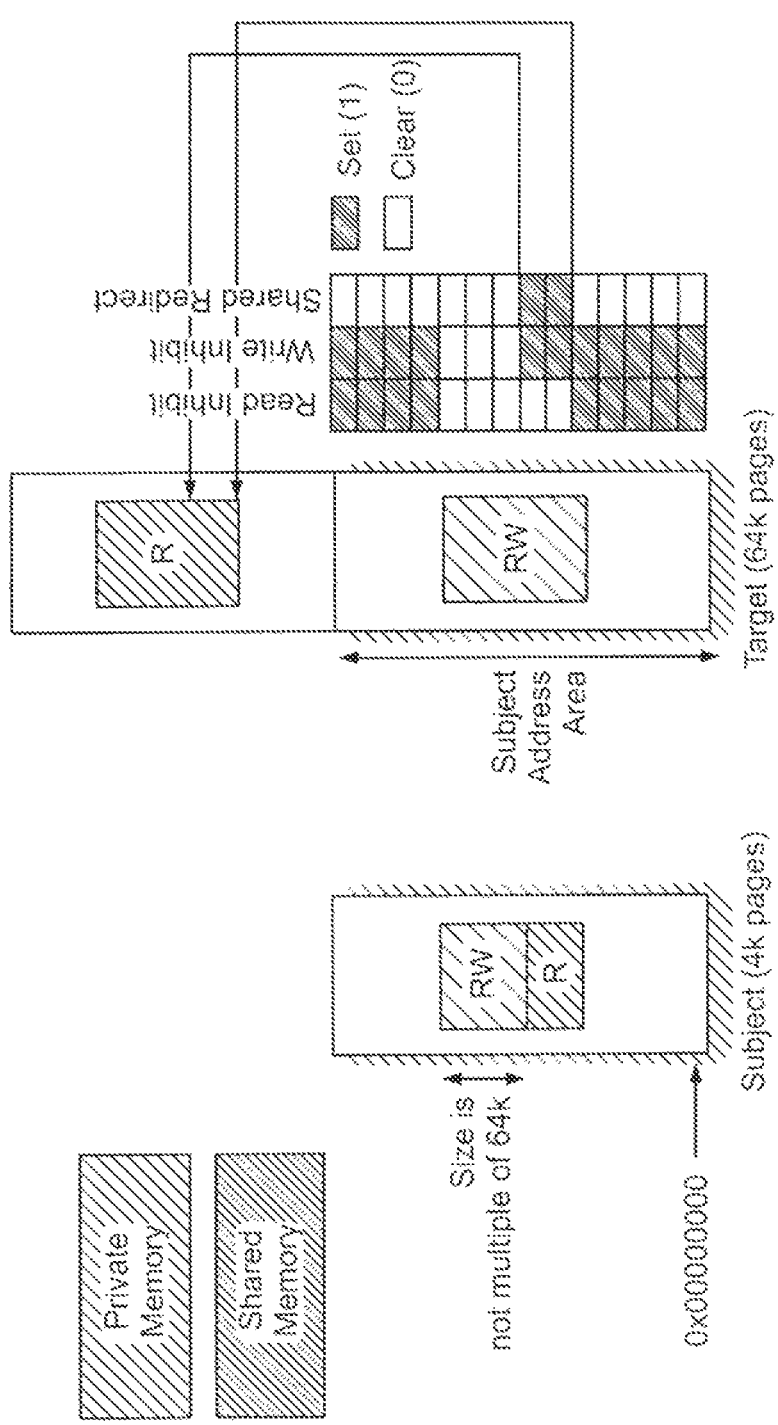

In FIG. 11e the shared memory is moved out of the way if a piece of private memory to be allocated on the target system would overlap with the allocation that has been made for the purposes of the shared memory, even though the two allocations may not overlap on the subject system.

A new private map is created in the place of the old map for the private memory—because of the constraints of the target page size, it is made larger if required.

The "Shared Redirect" bit is set in the pages that correspond to the piece of shared memory, meaning attempted accesses to those pages will fault and be directed to a handler routine which will perform the load from the appropriate place in the target address space—where the shared memory was actually mapped in.

When there is an attempt to access the memory, the shared redirect bits of the relevant addresses are examined by the page protection fault handling unit, for example by being ORed into the high order bits of the address in the same way as described above in relation to the read/write/execute inhibit bits. If the shared redirect bits are set then the access becomes an attempt to access a protected area and a target segmentation fault is generated. The page protection fault handling unit can then correctly access the true shared location in the target address space before control is returned.

Figure 12:
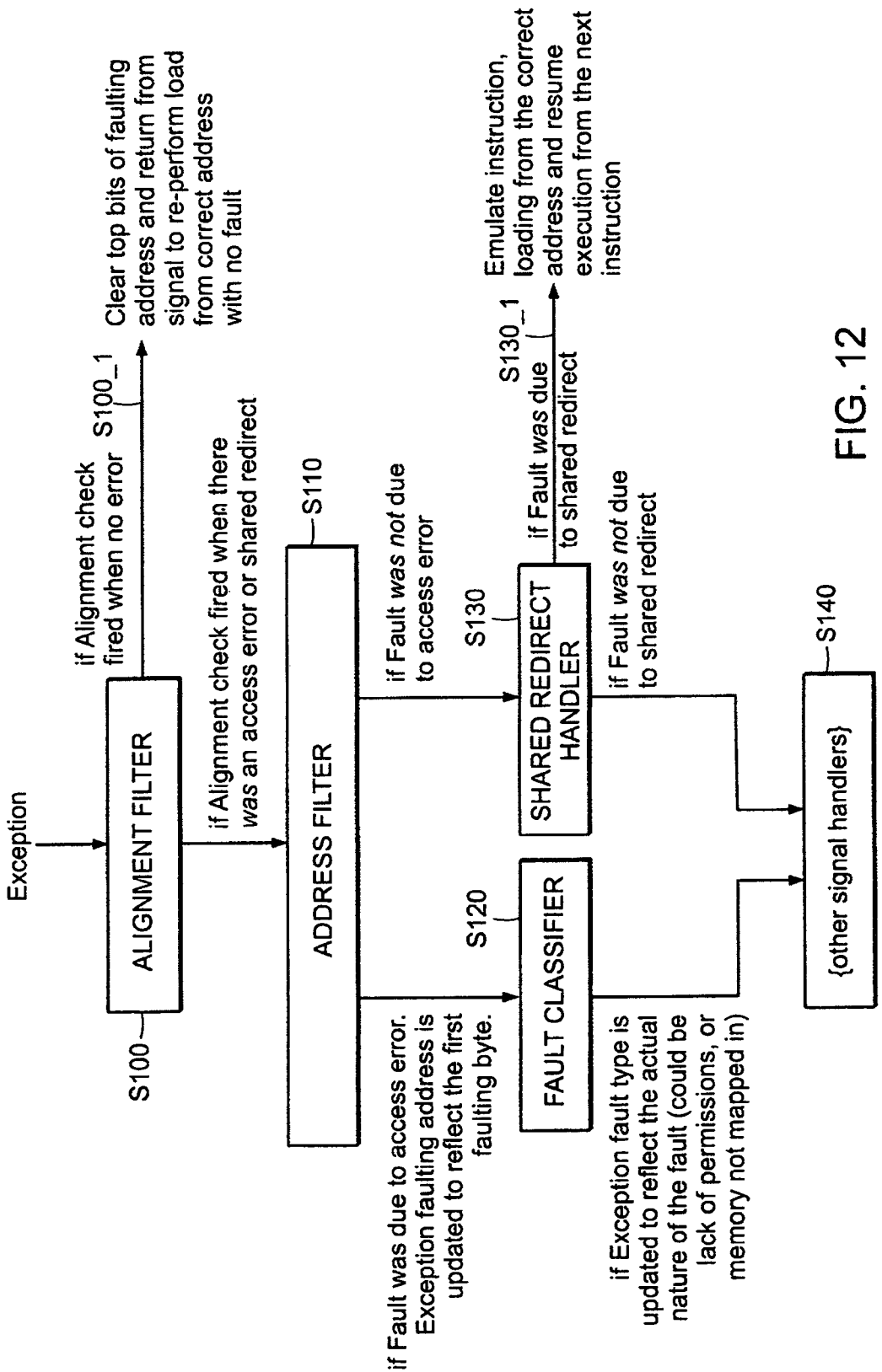
FIG. 12 is a schematic diagram illustrating the path of an exception through a page protection fault handler according to an exemplary embodiment.

FIG. 12 is a schematic diagram illustrating the operation of the page protection fault handler in response to an exception received thereby. In particular the diagram of FIG. 12 relates to page protection fault handlers such as the second and third embodiments described above, i.e. page protection fault handlers arranged to perform alignment checking. The alignment checking step S100 is the first performed step, and in page protection fault handlers which are not arranged to perform alignment checking this step is simply omitted.

At the alignment check step S100 it is determined whether a page boundary is crossed. If it determined that a page boundary is crossed but the attempted access is within the permissions of all relevant pages then the page protection fault handler clears the high order bits from the address in question and the attempted access is allowed to proceed (S100_1). Alternatively, if the alignment check indicates that the attempted access is not within the permissions of all relevant pages then the process continues to step S110.

At step S110 the page protection fault handler examines the faulting address, including the page descriptor which has been associated therewith by inclusion into the high order address bits. This address filtering step allows the page protection fault handler to determine if the attempted access is outside the page access permissions, or whether there is no unallowable access being attempted. In the former case the process continues to step S120 for further fault classification, and in the latter case the process continues to step S130 for shared redirect checking.

At step S120 the page protection fault handler updates the exception signal information it received to reflect the actual nature of the fault stemming from the attempted access. The fault information is updated to indicate lack of relevant permissions for the attempted access and the exception signal is passed on for handling elsewhere in the exception handler (S140).

At step S130 the page protection fault handler examines the shared redirect information to determine whether a shared redirect fault has occurred. If the shared redirect information indicates that a shared redirect fault has occurred (S130_1) then the attempted access is performed at the correct memory location according to the shared redirection. If there is no shared redirect fault is detected at this step, the exception signal is passed on for handling elsewhere in the exception handler (S140).

As discussed above, the exemplary page protection fault handling mechanisms of the present invention have many advantages. The page protection behaviour is carried out without the cost of obtaining a subject state representing an equivalent point in execution of the original subject code. The mechanisms used alleviate the problems that arise between small pages employed on a subject computing architecture in comparison with larger page sizes employed on the target architecture, and thus assist the target architecture to better support execution of the subject code. This is vitally important in the field of dynamic translation and especially dynamic binary translation where it is desired to automatically convert program code without any human intervention.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of handling page protection faults, comprising:
    converting a subject code executable that comprises a reference to at least one subject memory page having associated subject page access permissions into a target code executable by at least one target processor and including references to a target memory, the conversion including establishing a page descriptor store according to the reference to the subject memory page and the associated subject page permissions;
    responsive to an attempt to access a target memory location that crosses a subject page boundary, obtaining a page descriptor from the page descriptor store for each subject page of the attempted access and creating a composite page protection descriptor from the respective page descriptors; and
    allowing the attempt to access the target memory location to proceed without an interruption in control flow if the attempted access is within the permissions based on the composite page protection descriptor.

2. The method of claim 1, further comprising performing a logical OR operation using the respective page descriptors to create the composite page protection descriptor.

3. The method of claim 1, further comprising setting up, in the target memory, a guard representation of the subject memory pages, the guard representations resident in an address space in the target memory that is identifiable by the target processor unit as inaccessible.

4. The method of claim 3, further comprising attempting to access either the target memory location within the plurality of memory locations or the guard representations in accordance with the information in the page descriptor store.

5. The method of claim 3, further comprising generating an exception in response to an attempt to access the guard representations.

6. The method of claim 1, further comprising associating the plurality of memory locations in the target memory with information inserted into the page descriptor store to enable redirecting attempted accesses to shared subject pages to a corresponding shared region within the target memory.

7. The method of claim 1, further comprising generating an exception to the attempted access in response to the composite page protection descriptor indicating that permission is denied.

8. A computing system, comprising:
    a translator unit arranged to convert a subject code into a target code, the subject code including a reference to at least one subject memory page having associated subject page access permissions;
    a target processor unit arranged to execute the target code;
    a target memory associated with the target processor unit and including a page descriptor store and plurality of memory locations related to the subject memory pages, the page descriptor store established according to the reference to the subject memory page and the associated subject page permissions; and
    wherein the translator unit is configured to:
        responsive to an attempt to access a target memory location that crosses a subject page boundary, obtain a page descriptor from the page descriptor store for each subject page of the attempted access and creating a composite page protection descriptor from the respective page descriptors; and
        allow the attempt to access the target memory location to proceed without an interruption in control flow if the attempted access is within the permissions based on the composite page protection descriptor.

9. The computing system of claim 8, wherein the page descriptor store is populated in response to system calls in the subject code that modify memory layout.

10. The computing system of claim 8, wherein the translator unit is configured to perform a logical OR operation using the respective page descriptors to create the composite page protection descriptor.

11. The computing system of claim 8, wherein the translator unit is configured to set up, in the target memory, a guard representation of the subject memory pages, the guard representation resident in an address space in the target memory that is identifiable by the target processor unit as inaccessible.

12. The computing system of claim 11, wherein the translator unit is configured to attempt to access either the target memory location within the plurality of memory locations or the guard representations in accordance with the information in the page descriptor store.

13. The computing system of claim 8, wherein the translator unit is configured to associate the plurality of memory locations in the target memory with information inserted into the page descriptor store to enable redirecting attempted accesses to shared subject pages to a corresponding shared region within the target memory.

14. The computing system of claim 8, wherein the translator unit is configured to generate an exception to the attempted access in response to the composite page protection descriptor indicating that permission is denied.

15. A non-transitory computer readable medium having instructions recorded thereon which when executed by a computing system having at least one target processor cause the computing system to perform a process comprising:
    converting a subject code executable that comprises a reference to at least one subject memory page having associated subject page access permissions into a target code executable by at least one target processor and including references to a target memory, the conversion including establishing a page descriptor store according to the reference to the subject memory page and the associated subject page permissions;
    responsive to an attempt to access a target memory location that crosses a subject page boundary, obtaining a page descriptor from the page descriptor store for each subject page of the attempted access and creating a composite page protection descriptor from the respective page descriptors; and
    allowing the attempt to access the target memory location to proceed without an interruption in control flow if the attempted access is within the permissions based on the composite page protection descriptor.

16. The computer readable medium of claim 15, having instructions recorded thereon which when executed perform the further process of populating the page descriptor store in response to system calls in the subject code that modify memory layout.

17. The computer readable medium of claim 15, having instructions recorded thereon which when executed perform the further process of performing a logical OR operation using the respective page descriptors to create the composite page protection descriptor.

18. The computer readable medium of claim 15, having instructions recorded thereon which when executed perform the further process of setting up, in the target memory, a guard representation of the at least one subject memory page, said guard representation resident in an address space in the target memory that is identifiable by the target processor unit as inaccessible.

19. The computer readable medium of claim 18, having instructions recorded thereon which when executed perform the further process of attempting to access either the target memory location within the plurality of memory locations or the guard representations in accordance with the information in the page descriptor store.

20. The computer readable medium of claim 15, having instructions recorded thereon which when executed perform the further process of generate an exception to the attempted access in response to the composite page protection descriptor indicating that permission is denied.

* * * * *